Figures 1, 2:
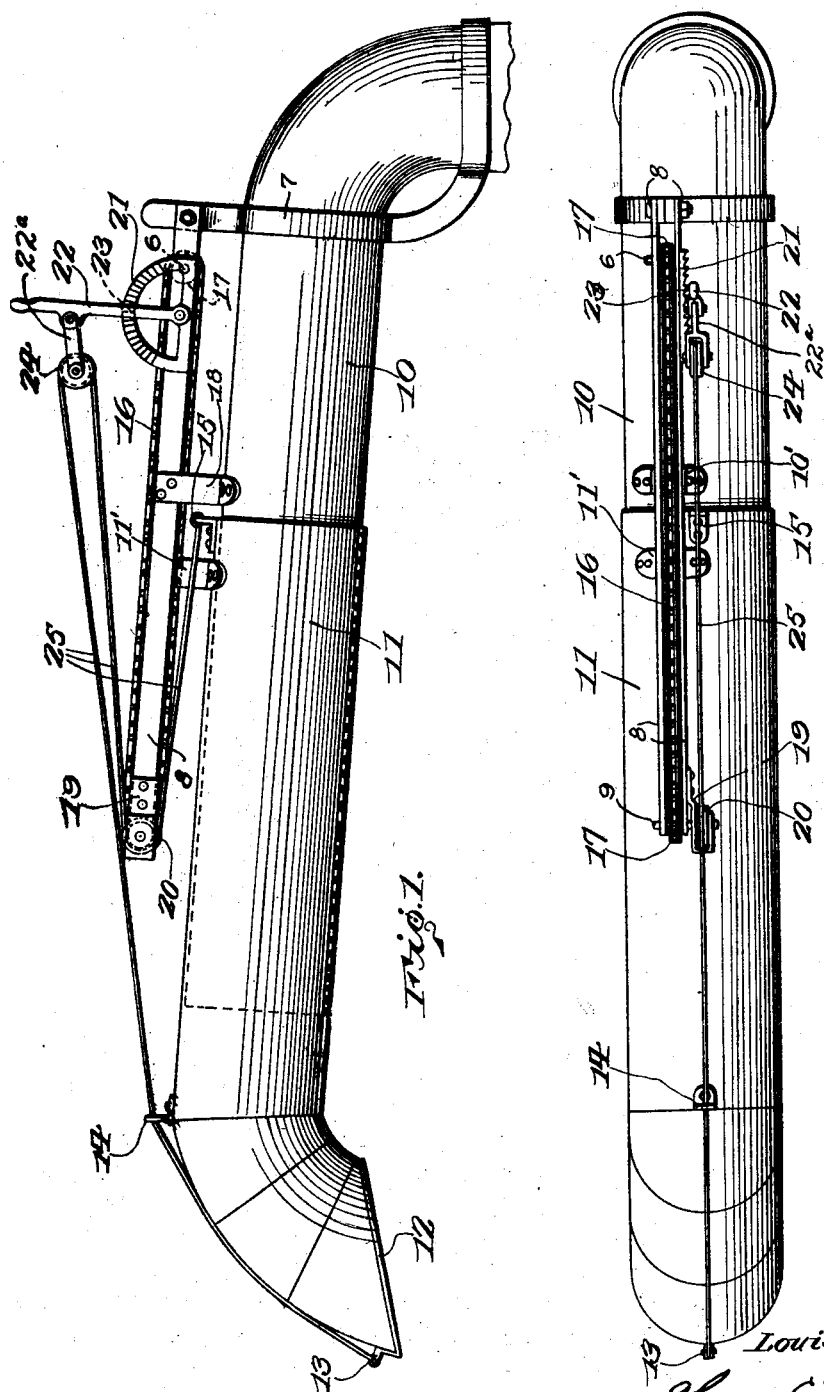

Oct. 27, 1925.

L. ADELMEYER 1,559,141

OPERATOR FOR BLOWER PIPE CAPS

Filed March 14, 1922

Inventor.
Louis Adelmeyer
By
Attorney

Patented Oct. 27, 1925.

1,559,141

UNITED STATES PATENT OFFICE.

LOUIS ADELMEYER, OF LOMIRA, WISCONSIN.

OPERATOR FOR BLOWER-PIPE CAPS.

Application filed March 14, 1922. Serial No. 543,764.

*To all whom it may concern:*

Be it known that I, LOUIS ADELMEYER, a citizen of the United States, residing at Lomira, in the county of Dodge, State of Wisconsin, have invented certain new and useful Improvements in Operators for Blower-Pipe Caps; and I do hereby declare the following to be a full, clear, and exact description of the invention, such as will enable others skilled in the art to which it appertains to make and use the same.

This invention relates to a threshing machine and particularly to a device for adjusting the hood at the end of the extensible blower pipe now commonly used on all grain threshing machines. As is well known to those skilled in the art, the straw and chaff is now blown out onto the stack through an extensible tube and such tubes are commonly provided at their outer ends with a curved spout usually made of swinging sector-shaped sections which telescope and can be collapsed or extended more or less to direct the straw and chaff in different directions.

It is an object of the present invention to provide a means for adjusting the said hood, which means will not be affected by the extension of the blower tube. The blower tube can thus be lengthened or shortened without changing the position or adjustment of said hood.

It is a further object of the invention to provide such an adjusting device comprising a flexible member or cable secured to said hood, which cable runs over a sheave carried on an adjusting lever, which lever is held in a desired position by having a pawl engaging a toothed segment. The flexible member then runs over another sheave which overhangs the longitudinally movable section of the blower tube, the flexible member having its end attached to said longitudinal movable section.

It is also an object of the invention to provide such an adjusting device which can be readily attached to the standard types of threshing machines and which comprises only the flexible member, the sheave-carrying lever and its segment, the bracket which carries the sheave overhanging the longitudinally movable section of the blower tube and the lug or bracket on said section to which the flexible member is secured.

It is also an object of the invention to provide a toothed segment used with laterally projecting ratchet teeth with which a tooth or pawl on the lever engages, whereby the adjustment of the lever can be very easily made.

These and other objects and advantages of the invention will more fully appear from the following description made in connection with the accompanying drawings in which like reference characters refer to the same parts throughout the different views and in which, Fig. 1 is a view in side elevation of a blower tube with the device attached thereto;

Fig. 2 is a top plan view of the parts shown in Fig. 1.

Referring to the drawings, a fixed section of the blower tube of the common type of threshing machine is shown as 10. This blower tube is now, on most threshing machines, supported by a rotating base or member so that the same can be swung about a vertical axis. A section 11 telescopes the section 10 and is longitudinally movable thereon and relatively thereto, said section 11 being moved by a lug or bracket 11′ secured thereto and also secured to one or more links on the lower run of an endless chain 16. The chain 16 travels about a sprocket 17 at one end mounted on a shaft 6 carried in longitudinally extending bars 8, which bars are secured at their inner ends to a bracket 7 which surrounds and is secured to the tube section 10 on both its vertical and horizontal portions. The bars 8 are also secured to brackets 18 which are, in turn, secured to the top of section 10. The outer end of the chain 16 runs over another sprocket 17 mounted on a shaft 9 extending between the bars 8. The bars 8 and brackets 7 and 18 are thus, in effect, one bracket. In the ordinary threshing machine the chain 16 is moved, usually by a hand wheel attached to shaft 6. The tube 11 has mounted on its end a hood 12 comprising one or more sector-shaped sections swingable about their inner ends and adapted to drop to their outer extended position by gravity. A lug 13 is attached to the outer section of said hood and a flexible member 25 is attached to said lug, which flexible member travels through a guide 14 secured to the outer end of the movable section 11. The parts so far described are the parts usually present on the ordinary commercial threshing machine.

In accordance with the present invention, an adjusting means for the hood 12 is provided adapted to allow of the motion of the extensible or movable section 11 and yet not change the position of adjustment of the said hood. To accomplish this; a segment 21 of semi-circular form is attached to one of the bars 8, which segment has projecting from one side thereof a series of ratchet teeth. A lever 22 is secured to the said segment, the attached end of the lever being attached at the center thereof and said lever having a tooth 23, at one side thereof, held against and adapted to engage with the teeth on said segment. The lever 22 is provided with a handle at its upper end and with an outwardly directed lug to which is secured a link 22ª bifurcated at its outer end to receive a sheave 24 mounted on a suitable bolt in said link. Another bracket 19 is bolted or riveted to one of the bars 8 at its outer end, which bracket is, at its outer end, bent substantially into U-shape to receive therein a sheave 20. The shaft 9 is extended through said bracket and the sheave 20 mounted thereon. The flexible member or cable 25 is then passed around the inner side of sheave 24 outwardly and over the outer side of sheave 20 and is carried inwardly and secured to a short angle bracket 15 attached to the inner end of the tube section 11. The only portion necessary, therefore, to apply the invention to the ordinary threshing machine, are the segment 21 and lever 22 with the parts carried by the latter, the bracket 19, sheave 20, and bracket 15. The segment 21 can be attached with only one extra bolt which is placed in the outer end thereof, the inner end being held in place by the shaft 6 which is generally in the form of a headed stud or bolt. In some cases it may be necessary to use an extra cap screw or bolt in the inner end of the segment 21. The bracket 19 is attached by two cap screws or rivets and a shaft or bolt 9 substituted of sufficient length to carry both the sprocket 17 and the sheave 20.

In operation, the hood 12 will be adjusted by swinging the lever 22 inwardly or outwardly. If the lever is swung inwardly, the cable 25 is pulled upon and the spout 12 swung up to collapsed or shortened position. If the lever 22 is allowed to swing outwardly, the hood 12 will drop to its fully extended position. The hood can, of course, be held in any desired position by engaging the tooth on lever 22 with the desired tooth on segment 21. It is only necessary to spring the lever 22 outward slightly and then swing the same to the desired position and allow the tooth 23 to again engage the teeth 21. The adjustment of the blower tube is usually made by a boy stationed at the base thereof. It is very desirable and, in fact, necessary, as a practical proposition, to adjust the blower tube without stopping the threshing machine and it is thus necessary that the adjustment can be easily and quickly made. With the present device, it is but a moment's work to adjust the lever 22 as desired. After the lever has been adjusted, if the tube 11 be traversed on the section 12, the cable 25 will merely run over the sheave 20, and since the sheave 20 is on the same axis as sprocket 17 and the end of the cable is attached to section 11, the upper run of the cable will not be moved. The intermediate run of the cable will simply be lengthened or shortened according to the lengthening or shortening of the lower run thereof. The adjustment of the hood 12, therefore, is not affected by the adjustment of the tube section 11.

From the above description it is seen that applicant has provided a simple and efficient mechanism for adjusting the hood or cap of the blower tube so that the adjustment thereof will not be affected by the extension of the blower tube. The applicant is aware that other structures have been proposed for adjusting the hood or cap so that the adjustment will not be varied by the extension of the tube. Such structures have not been practical and have not come into general use. The present invention can quickly and easily be applied to the standard threshing machine with little trouble and when once installed, can be easily and quickly operated without stopping the threshing machine. The device has been used in actual practice and its success and efficiency fully demonstrated.

It will, of course, be understood, that various changes may be made in the form, details, arrangement and proportions of the parts without departing from the scope of applicant's invention, which, generally stated, consists in a device capable of carrying out the objects above stated, such as shown and described and set forth in the appended claims.

What is claimed is:

1. The combination with a blower pipe of a threshing machine having a longitudinal section and a longitudinally movable section, a swinging hood carried at the end of the latter, and a bracket carrying means for moving said latter section, of a sheave carrying bracket secured to the outer end of said bracket, a segment having laterally projecting teeth secured adjacent the inner end of said bracket, a lever pivoted to said segment and having a tooth engaging with the teeth thereof, a sheave swingingly carried at an intermediate point on said lever, and a flexible member secured at its outer end to said hood, then passing inwardly over the sheave on said lever, then outwardly over the first mentioned sheave and then inwardly where it is secured adjacent the inner end of the longitudinally movable section whereby said longitudinally movable section can be moved without changing the adjustment of said hood.

2. The combination with a blower pipe having a stationary and a longitudinally movable section and an adjustable hood at the end of said movable section, of a bracket secured to said fixed section and overhanging said longitudinal movable section, spaced shafts journaled in said brackets, sprockets on said shafts, a chain passing about said sprockets and secured to said movable section whereby one of said shafts may be turned and said movable section moved outwardly, a sheave at the outer end of said bracket, an adjustable lever pivoted to said bracket, a toothed segment for holding said lever in adjusted positions, a sheave carried by said lever intermediate its ends, and a cable having one end secured to and movable with the longitudinally movable section extending around the outer side of said first mentioned sheave then around the inner side of said last mentioned sheave and to the adjustable hood.

3. The combination with a blower pipe having a stationary and a longitudinally movable section and an adjustable hood at the end of said movable section, of spaced means secured to said fixed section and extending vertically from the top thereof, parallel spaced bars secured to said means and projecting outwardly of said pipe and overhanging said movable section, a sprocket between said bars adjacent the outer ends thereof, a sprocket between said bars adjacent the inner ends thereof, a chain passing over said sprockets and secured to said movable section, a sheave-carrying bracket secured to the outer side of one of said bars at its outer end, a segment having laterally projecting teeth secured to the outer side of said last mentioned bar adjacent its inner end, a handle lever pivoted to said segment at the outer side thereof having a tooth adapted to engage the teeth on said segment, a link pivoted to said lever intermediate its ends having a sheave therein, a cable guide secured at the top of said movable section adjacent its outer end and a cable secured at one end adjacent the outer end of said hood and at the top thereof passing through said guide upward to and over said last mentioned sheave downwardly around the same and forwardly to said first mentioned sheave, and then rearwardly to the inner end of the movable section to where it is secured.

In testimony whereof, I affix my signature.

LOUIS ADELMEYER.